US008449702B2

(12) United States Patent
Batawi et al.

(10) Patent No.: US 8,449,702 B2
(45) Date of Patent: May 28, 2013

(54) METHOD FOR SOLID OXIDE FUEL CELL FABRICATION

(75) Inventors: Emad El Batawi, Sunnyvale, CA (US); Patrick Munoz, Milpitas, CA (US); Dien Nguyen, San Jose, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 17 days.

(21) Appl. No.: 13/211,903

(22) Filed: Aug. 17, 2011

(65) Prior Publication Data

US 2012/0043010 A1 Feb. 23, 2012

Related U.S. Application Data

(60) Provisional application No. 61/374,424, filed on Aug. 17, 2010.

(51) Int. Cl.

| | |
|---|---|
| ***C03B 29/00*** | (2006.01) |
| ***H01M 8/24*** | (2006.01) |
| ***H01M 8/06*** | (2006.01) |
| ***H01M 2/38*** | (2006.01) |
| ***H01M 2/02*** | (2006.01) |
| ***H01M 8/10*** | (2006.01) |
| ***H01M 2/20*** | (2006.01) |

(52) U.S. Cl.

USPC .................. 156/89.11; 156/89.12; 156/89.16; 429/408; 429/452; 429/454; 429/463; 429/482; 429/479; 429/495

(58) Field of Classification Search

USPC ...................... 156/89.12; 429/30, 33, 40, 482

See application file for complete search history.

(56) References Cited

U.S. PATENT DOCUMENTS

| | | | | |
|---|---|---|---|---|
| 5,314,711 | A * | 5/1994 | Baccini | 427/98.2 |
| 6,228,521 | B1 | 5/2001 | Kim et al. | |
| 6,399,233 | B1 | 6/2002 | Milliken et al. | |
| 6,682,842 | B1 | 1/2004 | Visco et al. | |
| 6,936,123 | B2 * | 8/2005 | Iseki et al. | 156/89.16 |
| 6,972,161 | B2 | 12/2005 | Beatty et al. | |
| 7,485,385 | B2 * | 2/2009 | Seccombe et al. | 429/469 |
| 2003/0082434 | A1 * | 5/2003 | Wang et al. | 429/40 |
| 2004/0018409 | A1 | 1/2004 | Hui et al. | |

(Continued)

FOREIGN PATENT DOCUMENTS

JP 53051213 A * 5/1978

OTHER PUBLICATIONS

International Search Report and Written Opinion issued in PCT Application No. PCT/US2011/047976, mailed on Mar. 19, 2012.
U.S. Appl. No. 11/907,204, filed Oct. 10, 2007.

(Continued)

*Primary Examiner* — Philip Tucker
*Assistant Examiner* — Alex Efta
(74) *Attorney, Agent, or Firm* — The Marbury Law Group PLLC

(57) ABSTRACT

A method of making a solid oxide fuel cell (SOFC) includes forming a first sublayer of a first electrode on a first side of a planar solid oxide electrolyte and drying the first sublayer of the first electrode. The method also includes forming a second sublayer of the first electrode on the dried first sublayer of the first electrode prior to firing the first sublayer of the first electrode, firing the first and second sublayers of the first electrode during the same first firing step, and forming a second electrode on a second side of the solid oxide electrolyte.

25 Claims, 10 Drawing Sheets

3 5 7 10 10 8 8 8 8 8 8 1 9 3 5 7 10 10 8 8 8 8 8 8 1 9

U.S. PATENT DOCUMENTS

2006/0115709 A1* 6/2006 Badding et al. ................. 429/39
2006/0159983 A1* 7/2006 Song ............................... 429/44
2006/0166070 A1 7/2006 Hickey et al.
2008/0096080 A1* 4/2008 Batawi et al. ................... 429/33
2008/0261099 A1* 10/2008 Nguyen et al. .................. 429/33
2009/0136821 A1* 5/2009 Gottmann et al. .............. 429/33

OTHER PUBLICATIONS

International Preliminary Report on Patentability issued in PCT Application No. PCT/US2011/047976, mailed on Aug. 16, 2011.

* cited by examiner

FUEL FLOW DIRECTION
3
13
17
15
11
5
7
DIRECTION OF INCREASING NICKEL CONTENT 3A
5
3C
3B
6
4
3

10
1
5
105
103
133
131
129
127
109
115
5
111
107
113
125
123
120
121
117
119

METHOD FOR SOLID OXIDE FUEL CELL FABRICATION

RELATED APPLICATION

This application claims priority to U.S. Provisional Application 61/374,424, filed on Aug. 17, 2010.

BACKGROUND OF THE INVENTION

The present invention is directed to fuel cell components generally and towards fabrication of solid oxide fuel cell anode and cathode materials.

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, propane, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit. A solid oxide reversible fuel cell (SORFC) system generates electrical energy and reactant product (i.e., oxidized fuel) from fuel and oxidizer in a fuel cell or discharge mode and generates the fuel and oxidant using electrical energy in an electrolysis or charge mode.

Anode electrodes operating under conditions of extreme fuel starvation are usually irreversibly damaged. Such starvation conditions are usually encountered in stacks where isolated repeat elements (i.e., specific fuel cells) obtain less fuel than their neighboring elements (i.e., the neighboring fuel cells). These elements witness effective fuel utilization in excess of 100%. Similar conditions may arise during system transitions or operating anomalies where the fuel supply to the cell does not correspond to the current drawn. Under these circumstances, the oxygen ion flux to the anode will oxidize the anode constituents. Nickel present at the three phase boundary of traditional anodes will instantaneously oxidize. The phase change from Ni metal to NiO is accompanied by a change in volume that causes mechanical damage at the anode/electrolyte interface. This mechanical damage is characterized by delamination of the electrode from the electrolyte which increases the specific resistance of the cell and dramatically decreases the stack performance. To avoid oxidation of the nickel and mechanical damage of the electrode electrolyte interface, which leads to delamination, one prior art solution was to employ an all ceramic anode. While the ceramic anodes show better stability in starvation conditions, they are associated with high polarization losses.

Solid oxide fuel cells operate using hydrocarbon based fuel. SOFC operate in one of two modes; a pre-reforming mode or an internally reforming mode. In the pre-reforming mode, the hydrocarbon fuel is pre-reformed into a syn-gas ($CO+H_2$) before entering the fuel cell. The anode provides an electro-catalytically active surface for oxidation of the pre-reformed fuel and ensures sufficient oxide-ionic and electronic conduction. In the internally reforming mode, the hydrocarbon fuel enters the solid oxide fuel cell where it is exposed to the anode. As in the pre-reforming mode, the anode provides both fuel oxidation and ionic and electronic transport. However, the anode must also internally reform the hydrocarbon fuel. State-of-the-art anodes are composites. These anodes are composed of an electrocatalytic material that is primarily an electronic conductor, such as Ni metal, and an oxide-ionic conductive material. Traditionally, state of the art anodes are Ni-ceria and Ni-zirconia. These anodes operating under internal reforming mode are susceptible to failure by anode delamination, structural failure at the leading edge where the hydrocarbon fuel enters the cell, or nickel dusting from internal Ni-carbide formation resulting in embrittlement.

SUMMARY

A method of making a solid oxide fuel cell (SOFC) includes forming a first sublayer of a first electrode on a first side of a planar solid oxide electrolyte and drying the first sublayer of the first electrode. The method also includes forming a second sublayer of the first electrode on the dried first sublayer of the first electrode prior to firing the first sublayer of the first electrode, firing the first and second sublayers of the first electrode during the same first firing step, and forming a second electrode on a second side of the solid oxide electrolyte.

BRIEF DESCRIPTION OF THE DRAWINGS

FIG. 5A shows an anode of a comparative example. FIG. 5B illustrates an anode of an example of the invention.

DETAILED DESCRIPTION OF THE EMBODIMENTS

Figure 1:
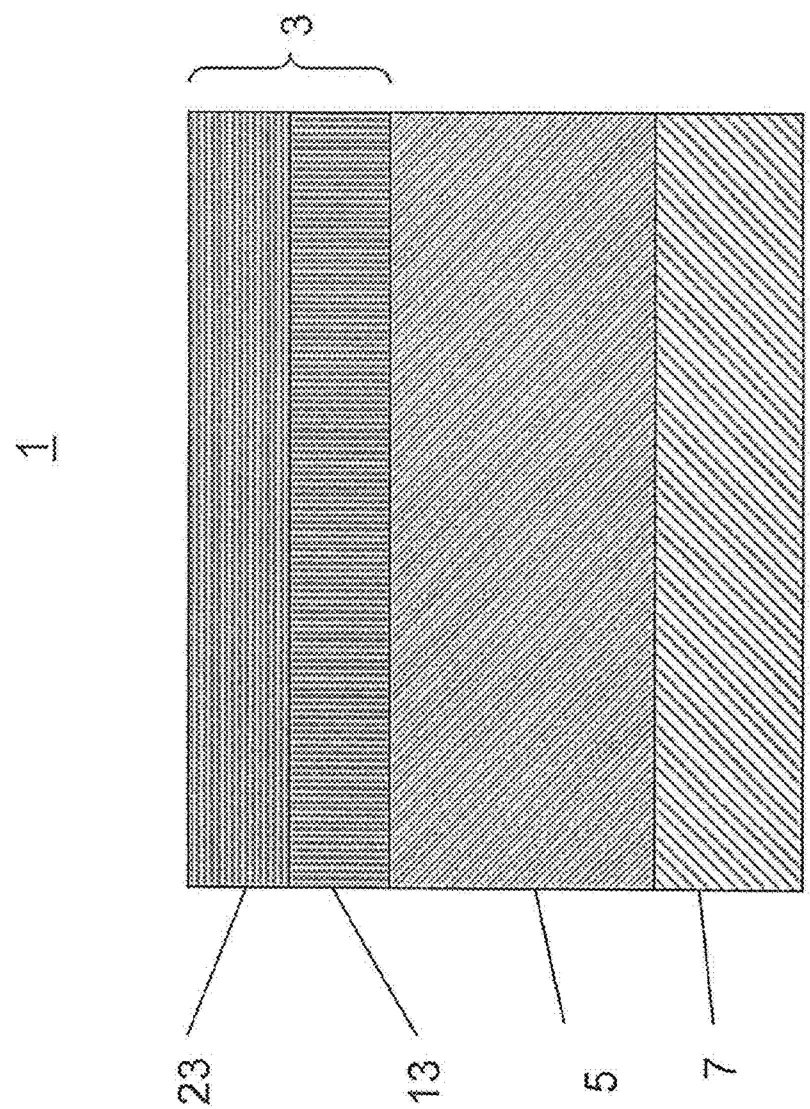
FIGS. 1 and 2 illustrate side cross-sectional views and FIG. 3 illustrates a top view of SOFCs of the embodiments of the invention.

In one embodiment of the invention, a SOFC anode electrode is formed by screen printing two or more anode sublayers. These sublayers are printed separately and allowed to dry at a low temperature and then they are fired in a single anode layer firing. Thus, in this embodiment, rather than sequentially depositing (e.g., printing) and firing each anode sublayer before depositing the next anode sublayer, the method of this embodiment includes depositing (e.g., screen printing) a first anode sublayer over the electrolyte, allowing the first sublayer to dry at relatively low temperature, and then depositing (e.g., screen printing) a second anode sublayer on top of the dried but unfired first anode sublayer. After all or a desired number of anode sublayers are deposited and dried, the plural anode sublayers are fired together in one firing step and a temperature that is at least three times higher than the drying temperature. For example, the drying steps may be conducted at a temperature of less than 150 C, such as 50 to 100 C, for example 70 to 80 C. The firing may be conducted at a temperature greater than 1000 C, such as 1100 C to 1400 C.

In another embodiment of the invention, a cathode electrode is formed by screen printing two or more cathode sublayers. These sublayers are printed separately and allowed to dry at a low temperature and then they are fired in a single cathode layer firing. Thus, in this embodiment, rather than sequentially depositing (e.g., printing) and firing each cathode sublayer before depositing the next cathode sublayer, the method of this embodiment includes depositing (e.g., screen printing) a first cathode sublayer over the electrolyte, allowing the first sublayer to dry at relatively low temperature, and then depositing (e.g., screen printing) a second cathode sublayer on top of the dried but unfired first cathode sublayer. After all or a desired number of cathode sublayers are deposited and dried, the plural cathode sublayers are fired together in one firing step and a temperature that is at least three times higher than the drying temperature. For example, the drying steps may be conducted at a temperature of less than 150 C, such as 50 to 100 C, for example 70 to 80 C. The firing may be conducted at a temperature greater than 1000 C, such as 1100 C to 1400 C.

In another embodiment of the invention, both the anode and the cathode electrode are formed by screen printing two or more anode and two or more cathode sublayers. These sublayers are printed separately and allowed to dry at a low temperature and then the anode sublayers are fired in a single anode layer firing and the cathode sublayers are fired in a single cathode layer firing. Preferably, the anode and the cathode layer firing steps are separate firing steps. Thus, either the anode or cathode sublayers are first deposited, dried and then fired together. Then, the other ones of anode or cathode sublayers are deposited, dried and then fired together. Either the anode or cathode sublayers may be deposited, dried and fired first.

In an alternative embodiment, the anode and the cathode layer firing is performed in the same step. In this case, the electrolyte containing dried anode and cathode electrode layers is provided into a furnace and the anode and cathode are co-fired during the same step.

In the above embodiments, screen printing is a preferred sublayer deposition method. For example, the screen printing may be performed with calendered mesh with a high wire density. In the screen printing methods, the anode and cathode ink preferably are self-leveling and have a relatively high solids loading of 80 to 93 weight percent. This ink formulation and electro-catalyst particle morphology that is characterized by a good rheology with a high solids loading allows for very thin sublayers (i.e., screen prints) containing highly active electro-catalysts. When these sublayers are sintered to the solid oxide electrolyte, they form dense electrodes, e.g., a dense anode electrode with limited residual strain.

In another embodiment of the invention, an anode electrode for a solid oxide fuel cell allows for the direct internal reforming of hydrocarbon fuels on the anode and reliable operation under fuel starvation conditions. The internal reforming anode will eliminate the need for a pre-reformer or an external reformer, thus significantly reducing the cost. The solid oxide fuel cell (SOFC) comprises a cathode electrode, a solid oxide electrolyte, and an anode electrode comprising a first portion and a second portion, such that the first portion is located between the electrolyte and the second portion. The anode electrode comprises a cermet comprising a nickel containing phase and a ceramic phase. The first portion of the anode electrode is a cermet comprising a nickel containing phase and a ceramic phase with a lower porosity and a lower ratio of the nickel containing phase to the ceramic phase than the second portion of the anode electrode. The two portions of the anode electrode may be formed from separately deposited and separately dried sublayers which are then fired together as described in the previous embodiments.

In one embodiment, the second portion further comprises a nickel containing phase in which the highly electrocatalytically active nickel is substituted in part by a metal which has a lower electrocatalytic activity than nickel (including non-electrocatalytic metals). The metal may comprise cobalt (Co) and/or copper (Cu) which is preferably but not necessarily alloyed with nickel to decrease the catalytic activity of the nickel containing phase. Decreased catalytic activity results in lower thermo-mechanical stress, which the inventors believe leads to lower anode delamination and mechanical damage. The substituted nickel cermet, such as a nickel alloy cermet, for example a Ni—Co alloy cermet, also exhibits a lower electrocatalytic activity in comparison with the pure Ni cermet where all other parameters are kept constant.

The embodiments of the invention provide anode electrodes for solid oxide fuel cells, such as reversible SOFCs (i.e., SORFC) and non-reversible SOFCs, that do not irreversibly deteriorate under conditions of extreme fuel starvation. The embodiments of the invention conduct internal reformation of hydrocarbon based fuels without mechanical damage to the anode. The anode electrodes display improved output efficiency and polarization losses comparable to prior art Ni—YSZ anodes. Therefore, the anode conducts fuel oxidation, ionic and electronic transport, and reforming of the hydrocarbon fuel under conditions of fuel starvation. Furthermore, after a starvation event, the performance of the anode electrodes of the embodiments of the invention is hardly affected and there is minimal mechanical deterioration of the anode.

The anode electrode of one embodiment of the invention is a cermet comprising a nickel containing phase (i.e., a metal phase which includes nickel) and a ceramic phase. The nickel containing phase preferably contains nickel in a reduced state, or nickel with one or more additional metals, such as cobalt and/or copper, in a reduced state. This phase forms a metal oxide when it is in an oxidized state. Thus, the anode electrode is preferably annealed in a reducing atmosphere prior to operation to reduce the nickel oxide to nickel. The nickel containing phase may consist essentially of only nickel or it may include other metal(s) in addition to nickel. For example, the nickel containing phase may contain an alloy of nickel and an additional metal, such as cobalt or copper. The metal phase is preferably finely distributed in the ceramic phase, with an average grain size less than 500 nanometers, such as 100 to 400 nanometers, to reduce the stresses induced when nickel converts to nickel oxide. The ceramic phase preferably comprises a doped ceria, such as a samaria, gadolinia or yttria doped ceria (in other words, the ceria may contain Sm, Gd and/or Y dopant element which forms an oxide upon incorporation into the ceria). Preferably, the doped ceria phase composition comprises $Ce_{(1-x)}A_xO_2$, where A comprises at least one of Sm, Gd, or Y, and x is greater than 0.1 but less than 0.4. For example, x may range from 0.15 to 0.3 and may be equal to 0.2. Samaria doped ceria (SDC) is preferred. Furthermore, the doped ceria may be non-stoichiometric, and contain more than or less than two oxygen atoms for each one metal atom. Alternatively, the ceramic phase comprises a different mixed ionic and electrically conductive phase, such as a perovskite ceramic phase, such as $(La, Sr)(Mn,Cr)O_3$, which includes LSM, lanthanum strontium chromite, $(La_xSr_{1-x})(Mn_yCr_{1-y})O_3$ where $0.6 \leqq x < 0.9$, $0.1 < y < 0.4$, such as x=0.8, y=0.2, etc.

In one embodiment of the invention, the anode electrode contains less nickel phase in a portion near the electrolyte than in a portion near the electrode surface distal from the electrode (i.e., the "free" electrode surface which faces away from the electrolyte). In another embodiment of the invention, the anode electrode contains less porosity in a portion near the electrolyte than in a portion near the "free" electrode surface distal from the electrode. In another embodiment of the invention, the anode electrode contains an additional metal, such as Co and/or Cu alloyed with the nickel, in a portion near the electrode surface distal from the electrolyte. If desired, the additional metal may be omitted from the portion of the anode near the electrolyte (i.e., no intentionally introduced Cu or Co, but possible unintentional background Co or Cu impurity or diffusion presence). Preferably, the anode electrode contains less nickel and less porosity in the portion near the electrolyte and an additional metal in the portion distal to the electrode.

FIG. 1 illustrates a solid oxide fuel cell (SOFC) 1 according to an embodiment of the invention. The cell 1 includes an anode electrode 3, a solid oxide electrolyte 5 and a cathode electrode 7. The electrolyte 5 may comprise a stabilized zirconia, such as scandia stabilized zirconia (SSZ) or yttria stabilized zirconia (YSZ). Alternatively, the electrolyte 5 may comprise another ionically conductive material, such as a doped ceria. The cathode electrode 7 may comprise an electrically conductive material, such as an electrically conductive perovskite material, such as lanthanum strontium manganite (LSM). Other conductive perovskites, such as lanthanum strontium cobaltite $(La,Sr)CoO_3$, lanthanum strontium cobalt ferrite $(La,Sr)(Co,Fe)O_3$, etc., or metals, such as Pt, may also be used. In one embodiment, the cathode electrode 7 is composed of several separately deposited sublayers, as will be discussed in more detail below. This allows the cathode electrode to be made thicker compared to single layer electrodes formed by prior art screen printing method.

As shown in FIG. 1, the anode electrode 3 comprises a first portion 13 and a second portion 23. The first portion 13 is located between the electrolyte 5 and the second portion 23. As noted above, preferably, the first portion of the anode electrode 13 contains a lower ratio of the nickel containing phase to the ceramic phase than the second portion 23 of the anode electrode. Furthermore, preferably, the first portion of the anode electrode 13 contains a lower porosity than the second portion 23 of the anode electrode. In addition, the second portion 23 may contain an additional metal alloyed with nickel, such as Co or Cu. Alternatively, the Cu or Co may be provided separately from Ni (e.g., not pre-alloyed) into the anode electrode. Thus, the porosity and the ratio of the nickel phase to the ceramic phase increases in as a function of thickness of the anode electrode 3 in a direction from the electrolyte 5 to the opposite surface of the anode electrode 3. The additional metal in the second portion is a step function. The first portion contains no additional metal, while the second portion contains a uniform concentration.

For example, the first portion 13 of the anode electrode may contain a porosity of 5-30 volume percent and a nickel phase content of 1 to 20 volume percent. The second portion 23 of the anode electrode may contain a porosity of 31 to 60 volume percent, a nickel phase content of 21 to 60 volume percent. The nickel containing phase may optionally contain between 1 and 50 atomic percent, such as 5-30 at % of an additional metal, such as cobalt and/or copper, and the balance nickel.

In one embodiment, the first 13 and the second 23 portions of the anode electrode 3 comprise separate sublayers. Thus, the first region 13 comprises a first sublayer in contact with the electrolyte 5 and the second region 23 comprises a second sublayer located over the first sublayer 13. The first sublayer 13 contains a lower porosity and lower nickel to doped ceria ratio than the second sublayer 23. The second sublayer 23 may contain an additional metal, such as Co or Cu, as described above.

The first sublayer 13 may contain between 1 and 15 volume percent of the nickel containing phase, between 5 and 30 percent pores, such as between 5 and 20 or between 15 and 25 volume percent pores, and remainder the doped ceria phase. For example between 1 and 5 volume percent of the nickel containing phase, between 5 and 10 volume percent pores and remainder the doped ceria phase. The second sublayer 23 contains over 20 volume percent nickel containing phase, between 20 and 60 volume percent pores, such as between 40 and 50 percent pores, and remainder is the doped ceria phase. For example, it contains between 30 and 50 volume percent of the nickel containing phase (which optionally contains 1-30 at %, such as 5-10 at % Co and/or Cu and balance Ni), between 30 and 50 volume percent pores and remainder the doped ceria phase. In the first sublayer 13, the volume ratio of the nickel containing phase to the doped ceria containing phase may range from 1:8 to 1:10, for example 1:9. In the second sublayer 23, the volume ratio of the nickel containing phase to the doped ceria containing phase may range from 3:1 to 5:1, for example 4:1. The first sublayer 13 may contain between 5 and 25 weight percent nickel containing phase, such as between 10 and 20 weight percent nickel containing phase, and between 75 and 95 weight percent doped ceria containing phase, such as between 80 and 90 weight percent doped ceria phase. The second sublayer 23 may contain between 60 and 85 weight percent nickel containing phase, such as between 70 and 75 weight percent nickel containing phase, and between 15 and 40 weight percent doped ceria containing phase, such as between 25 and 30 weight percent doped ceria phase. The optimum ratio of nickel to ceramic is determined by the requisite electronic conductivity, ionic conductivity, porosity, and electrocatalytic properties necessary for optimal anode performance.

Thus, the anode electrode 3 contains plurality of sublayers, each varying in composition, structure and nickel content. Each layer is approximately 3-30 microns thick, such as 5-10 microns thick, for example. Preferably, the first sublayer 13 is 3-6 microns thick and the second sublayer 23 is 6-10 microns thick for a total thickness of 9-16 microns. The first sublayer in contact with the electrolyte has a higher density and lower nickel content than the one or more sublayers further away from the electrolyte. A porosity gradient is established ranging from approximately 5-15% close to the electrolyte and increasing to about 50% at the anode electrode's free surface. The nickel content in the electrode increases in a similar manner as the porosity. The second sublayer, farther away from the electrolyte, optionally has an additional metal, such as Co or Cu, alloyed with nickel.

In another embodiment of the invention, each of the first 13 and second 23 regions may comprise plural sublayers. For example, each region 13, 23 may contain two sublayers, such that the anode electrode 3 contains a total of four sublayers. In this case, the first region 13 comprises a first sublayer in contact with the electrolyte and a second sublayer located over the first sublayer, while the second region 23 comprises a third sublayer located over the second sublayer and a fourth sublayer located over the third sublayer. In this configuration, a porosity of the anode electrode increases from the first sublayer to the fourth sublayer and the nickel phase content of the anode electrode increases from the first sublayer to the fourth sublayer. In other words, the sublayer which contacts the electrolyte 5 has the lowest porosity and nickel phase content, while the sublayer which is located farthest from the electrolyte contains the highest porosity and nickel phase content (and the lowest doped ceria phase content).

For example, the first sublayer closest to the electrolyte 5 may contain between 1 and 5 volume percent of the nickel containing phase, between 5 and 15 volume percent pores and remainder the doped ceria phase. The second sublayer may contain between 6 and 20 volume percent of the nickel containing phase, between 20 and 40 volume percent pores and remainder the doped ceria phase. The third sublayer may contain between 25 and 35 volume percent of the nickel containing phase, between 30 and 50 volume percent pores and remainder the doped ceria phase. The fourth sublayer which is farthest from the electrolyte 5 may contain between 35 and 45 volume percent of the nickel containing phase (which optionally includes 1-30 at %, such as 5-10 at % Cu and/or Co and balance Ni), between 40 and 60 volume percent pores, and remainder the doped ceria phase.

Figure 4:
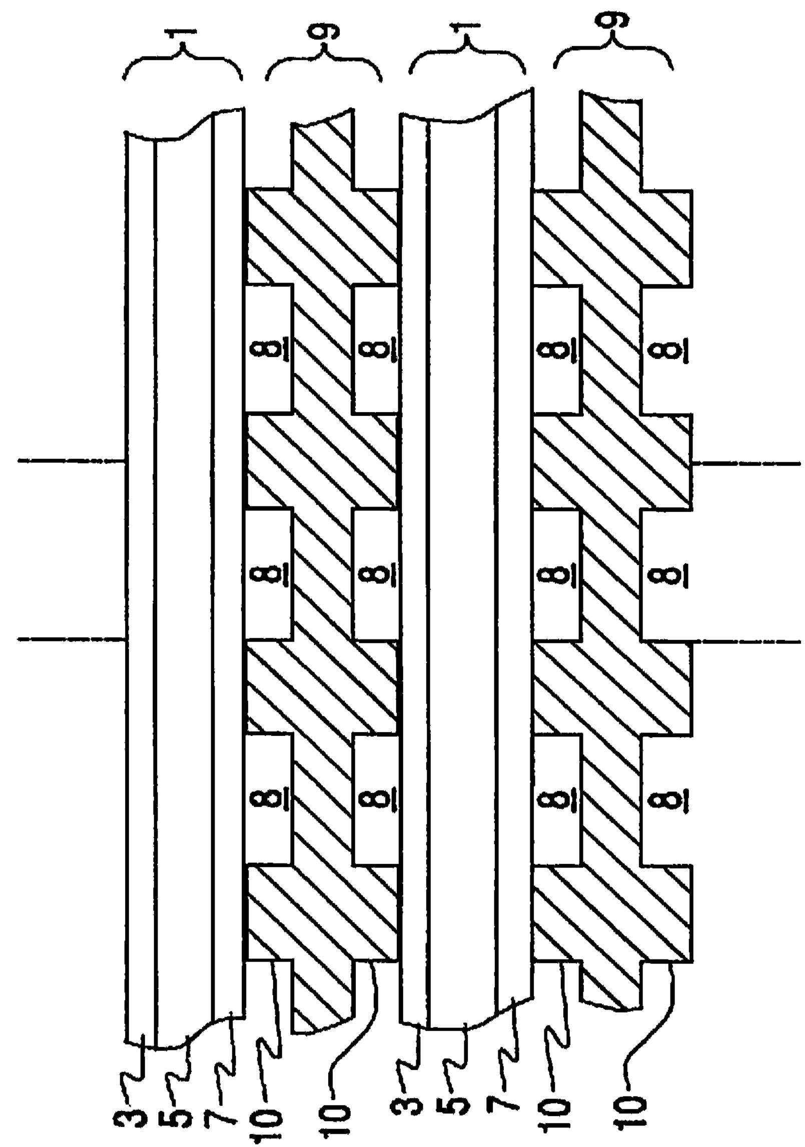
FIG. 4 illustrates a side cross sectional view of SOFC stack of an embodiment of the invention.

Fuel cell stacks are frequently built from a multiplicity of SOFC's 1 in the form of planar elements, tubes, or other geometries. Fuel and air has to be provided to the electrochemically active surface, which can be large. As shown in FIG. 4, one component of a fuel cell stack is the so called gas flow separator (referred to as a gas flow separator plate in a planar stack) 9 that separates the individual cells in the stack. The gas flow separator plate separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. The separator 9 contains gas flow passages or channels 8 between the ribs 10. Frequently, the gas flow separator plate 9 is also used as an interconnect which electrically connects the fuel electrode 3 of one cell to the air electrode 7 of the adjacent cell. In this case, the gas flow separator plate which functions as an interconnect is made of or contains electrically conductive material. An electrically conductive contact layer, such as a nickel contact layer, may be provided between the anode electrode and the interconnect. FIG. 4 shows that the lower SOFC 1 is located between two gas separator plates 9.

Furthermore, while FIG. 4 shows that the stack comprises a plurality of planar or plate shaped fuel cells, the fuel cells may have other configurations, such as tubular. Still further, while vertically oriented stacks are shown in FIG. 4, the fuel cells may be stacked horizontally or in any other suitable direction between vertical and horizontal.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity, such as a column. In this case, the electrical power output from both stacks cannot be separately controlled.

Figure 2:
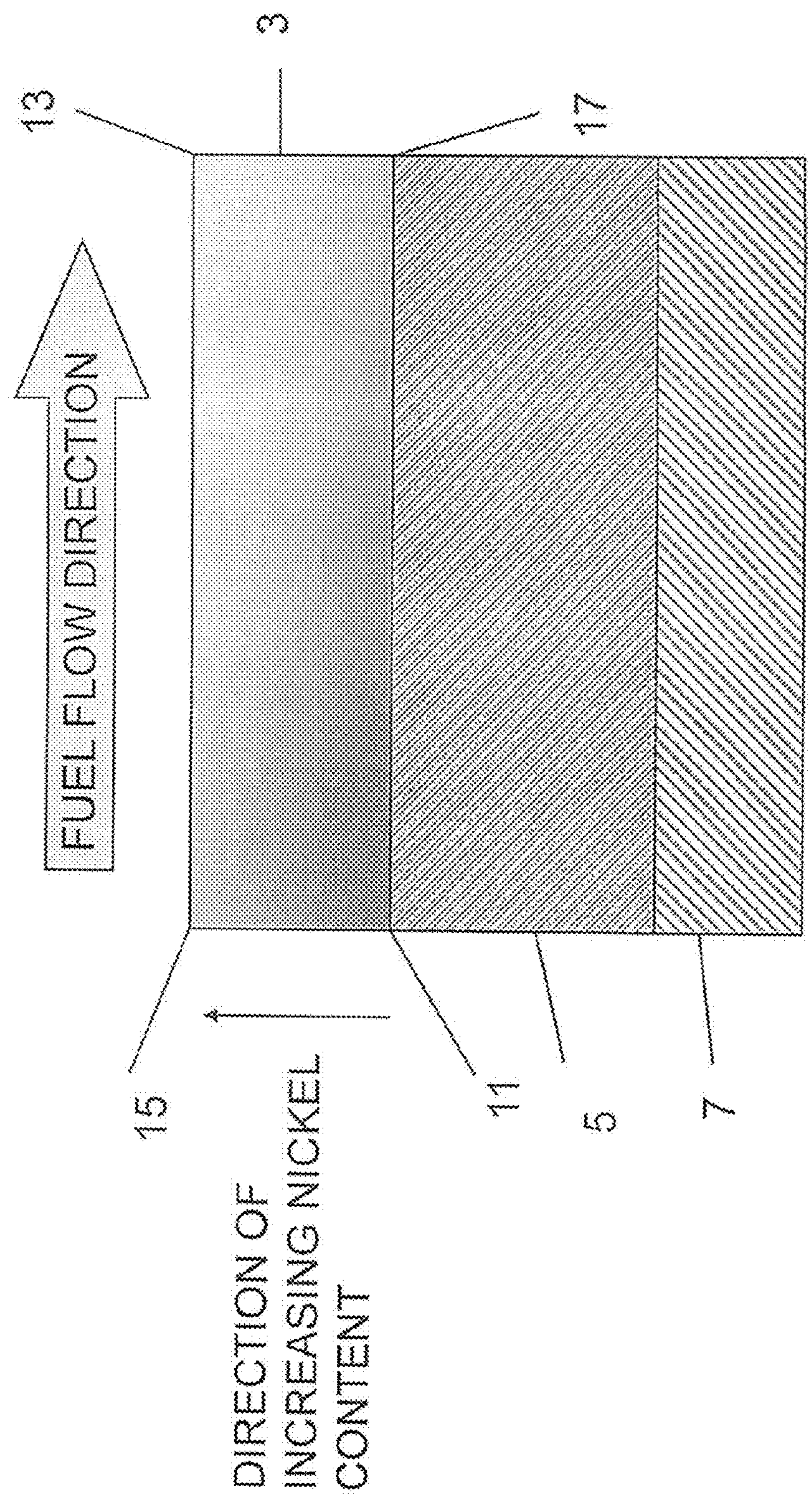
Figure 3:
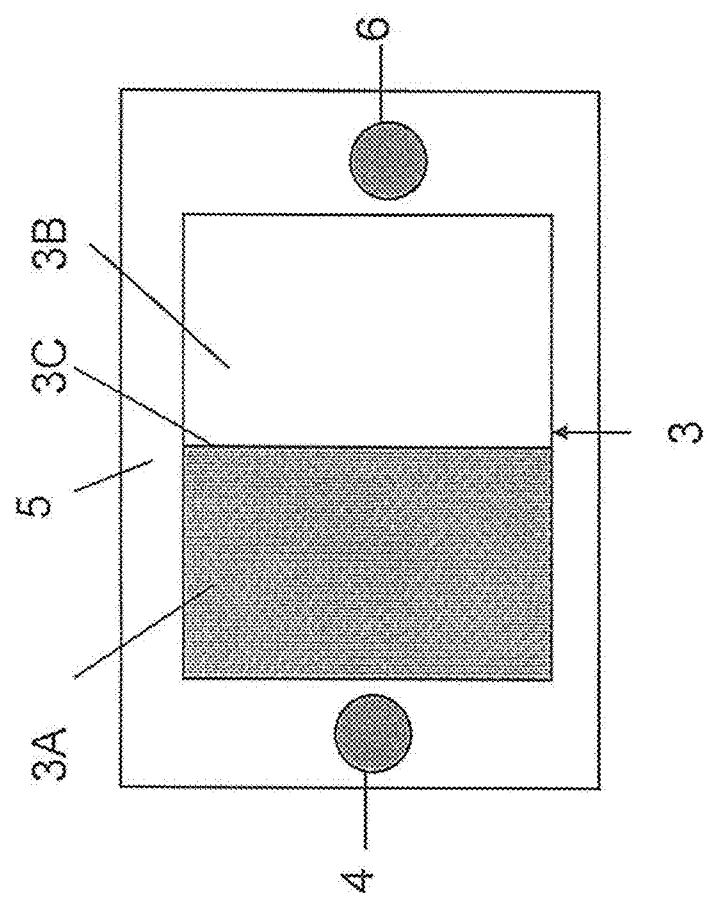

A method of forming a planar, electrolyte supported SOFC 1 shown in FIGS. 1, 2 and 3 includes forming the cathode electrode 7 on a first side of a planar solid oxide electrolyte 5 and forming the cermet anode electrode 3 on a second side of the planar solid oxide, electrolyte 5, such that a first portion of the anode electrode adjacent to the electrolyte contains a lower porosity and a lower ratio of the nickel containing phase to the ceramic phase than the second portion of the anode electrode located distal from the electrolyte. The anode and the cathode may be formed in any order on the opposite sides of the electrolyte.

The anode electrode containing a plurality of sublayers shown in FIG. 1 may be formed by a screen printing method or by other suitable methods. For example, a first sublayer 13 containing a low porosity and a low nickel content can be screen printed on the electrolyte 5, followed by screen printing a second sublayer 23 with a higher porosity and a higher nickel content on the first sublayer 13. As described above, sublayer 13 may be screen printed on the electrolyte 5, then dried at a temperature below 150 C, such as about 70 C, followed by screen printing of sublayer 23 over dried sublayer 13, optional drying of sublayer 23, and finally firing of both sublayers 13 and 23 at a temperature above 1000 C.

A non-limiting, exemplary method of making the anode and cathode electrodes by screen printing, drying and firing will now be described.

Bare, plate shaped solid oxide electrolytes 5, such as scandia stabilized zirconia electrolytes are unpackaged and placed into a slotted cassette 101. Each cassette is installed into an elevator 103 which positions the individual electrolyte substrate 5 onto a walking beam conveyor 105. The walking beam conveyor transports the electrolyte substrates 5 to a printing tool plate 107, while exposing the substrates to minimal abrasion during the process. A pick-up head 109 may be used to place the electrolyte substrate from the end of the walking beam conveyor onto the tool plate. The pick up head may be configured with a Bernoulli pad or vacuum pogo pin array to pick up the electrolyte substrate.

The screen print cycle initiates once the pick up head 109 lowers the electrolyte substrate 5 onto the tool plate 107. First, multiple snugger alignment pins 111 collapse inward toward the substrate 5. The pins may be fixed and/or pressure loaded. The combined inward movements position the substrate to a predetermined alignment position. A small amount of tool plate 107 vacuum is utilized to keep the substrate 5 from oscillating between the snugger pins. Once the substrate is positioned, a hold down vacuum is applied and all snugger pins 111 retract out and away from the work area. Afterward, the tool plate 107 carriage 113 shuttles below a mesh screen 115 (e.g., a calendared mesh with a high wire density) and the print cycle initiates. The print cycle includes the screen printing process using screen printing suitable ink, such as an ink with a relatively high solids loading of 80 to 93 weight percent, and screen tooling which defines the deposited ink image and ink deposition characteristic.

Various process parameters may be adjusted to achieve a desired layer deposition thickness and quality. Fine adjustments may be made by adjusting the print settings and course adjustments may be made by adjusting the screen configuration in the screen printing process.

In another embodiment, the ink may be dispensed on the screen before the printing step, thus reducing the time the ink on the screen is exposed to external environment before drying. This increases the stability of the process and viscosity of the ink does not change due to drying. This process also reduces or eliminates contamination and reduces ink waste.

After the electrode screen print cycle is completed, the electrolyte substrate 5 is lifted off the tool plate 107 either manually or by any suitable machine or device, such as a pick up head 109. The tool plate returns to its home position to receive the next substrate. The previously printed substrate 5 is transported down a conveyor 117 to a predetermined pick up location. Another pick up head 119, such as a robotic pick up head, lowers and surrounds the substrate with two or more cleats. The cleats do not apply pressure to the substrate in order to minimize chipping or damage to the substrate. The pick up head raises and secures the substrate with the force of gravity. The head then transports the electrolyte substrate to a dryer belt 121 and releases the substrate onto the dryer belt.

Any suitable dryer may be used. For example, the dryer 120 may include the dryer conveyor belt 121, such as a woven stainless steel belt or other suitable conveyor belt travelling through an infrared heating zone 123 heated by one or more infrared heating lamps 125. The electrolyte substrate 5 is transported by the belt 121 to the heating zone 123 and heated in the heating zone by the heating lamp(s) 125. During the heating process, a percentage of the ink organics are released from the electrode(s), which prepares the substrate for further processing.

The belt 121 may remain continuously moving while carrying the substrate through the heating zone. Alternatively, the belt 121 may transport the substrate to the heating zone, then stop while the substrate is being heated, followed by moving the substrate out of the heating zone after completion of the heating. If desired, the dryer may comprise two or more belts and/or two or more heating zones. In case of two or more belts 121, the pick up head 119 may be pre-programmed or controlled by an operator or control system to sequentially place the substrates on different belts to dry the substrates in parallel rather than in series.

The dried electrolyte 5 substrate is then removed from the dryer 120 ether manually or by machine. Any suitable machine may be used. For example, a robotic Bernoulli pad or vacuum pick up head 127 with configured pogo pins may be positioned near the dryer exit. The pad or head removes the substrate from the dryer belt and places it on a walking beam conveyor 129. The walking beam conveyor transports the substrate to an exit elevator 131, which then loads the substrate 5 into a cassette 133 for further processing.

For electrodes comprising two or more sublayers, such as the anode electrode described above, these sublayers are printed separately and allowed to dry at a low temperature and then they are fired in a single anode layer firing. Thus, as described above, after the first anode sublayer is printed on the electrolyte substrate and dried in the dryer, the electrolyte is returned from the dryer to the screen printing station to deposit the second anode sublayer on the first anode sublayer. After the second anode sublayer is deposited on the first sublayer and dried in the drier, the electrolyte substrate is provided from the dryer to a furnace where the plural anode sublayers are fired together in one firing step at a temperature that is at least three times higher than the drying temperature. For example, the drying steps may be conducted at a temperature of less than 150 C, such as 50 to 100 C, for example 70 to 80 C. The firing may be conducted at a temperature greater than 1000 C, such as 1100 C to 1400 C.

In an alternative embodiment, the anode or cathode sublayers are printed upon each other without going through the drying process. In this "wet-on-wet" process, the first sublayer is screen printed on the electrolyte, followed by screen printing the second sublayer on the wet first sublayer of the same electrode followed by firing, or drying and firing the wet sublayers of this electrode. For example, two anode sublayers 13, 23 may be deposited on the electrolyte 5 without an intermediate drying step between the deposition of the first 13 and the second 23 anode sublayers. In this case, the first anode sublayer 13 is deposited (e.g., screen printed) on the electrolyte, and while the first sublayer is still wet, a second anode sublayer 23 is deposited (e.g., screen printed) on the wet first sublayer 13. Both sublayers 13, 23 may then be dried and fired, or fired without drying. Preferably, the first sublayer 13 ink used during screen printing of the first sublayer 13 has a higher viscosity than the second sublayer 23 ink used during screen printing of the second sublayer 23. The first sublayer ink may have a viscosity that is 10% to 200% higher than the second sublayer ink density. This method increases process throughput, improves redox behavior of the anode, and eliminates a distinct boundary between the two sublayers. For example, the bottom portion of the anode 3 (i.e., the portion of anode 3 corresponding to sublayer 13 near the electrolyte 5) may have less nickel and more ceria phase compared to the top portion of the anode 3 (i.e., the portion of anode 3 corresponding to sublayer 23 distal from the electrolyte 5). However, rather than having a distinct boundary between the sublayers 13, 23, a diffuse interface having an intermediate content of the nickel and ceria phases (i.e., having more nickel than in the bottom portion and less nickel than in the top portion of the anode) is located between the top and bottom portions of the anode.

As discussed above, after the printing and drying processes, each substrate is subjected to a thermal process referred to as "firing", which includes burnout and sintering of the electrolyte substrate. A high temperature furnace may be used for the firing (i.e., both burnout and sintering may be performed in the same furnace).

The electrolyte substrates may be loaded into the furnace in a different manner for anode and cathode electrode firing steps. For the electrode that is fired first, the substrates may be stacked face to face into a stack and then placed into the furnace. For the electrode that is fired second, each substrate may placed into the furnace without contacting adjacent substrates. For example, the substrates may be inserted into one or more ceramic supports, frames or boats which are then inserted into the furnace.

For example, for fuel cells in which the anode is deposited and fired first followed by depositing and firing the cathode, the following process may be used. A plurality of planar (e.g., plate shaped) solid oxide electrolytes each have a first major side and a second major side. A first electrode is formed on the first major side of each of the plurality of planar solid oxide electrolytes. The first electrode may be formed by the dual screen printing method above or by any other suitable method. The plurality of solid oxide electrolytes are stacked into a stack such that the first major sides containing the first electrode of each pair of adjacent electrolytes in the stack face each other. Thus, except for a top and bottom electrolyte in the stack, the second major sides of each pair of adjacent electrolytes in the stack face the second major side of an adjacent electrolyte in the stack. The stack is then fired. Preferably, the second major sides of each electrolyte in the stack lack an electrode during the step of firing, and the first major sides containing the first electrode of each pair of adjacent electrolytes in the stack contact each other during the step of firing.

For example, for anode electrode firing, the fuel cells (e.g., the electrolyte substrates with printed anodes) may be stacked in contact with each other into a stack. The cells may be oriented face-to-face in an alternating fashion. In other words, the anode electrodes of a pair of adjacent cells are placed in contact with each other, and the unprinted cathode sides of two other adjacent cells contact the unprinted cathode sides of the pair of cells. Thus, the anode printed electrolyte substrates are placed with the printed surfaces facing each other. Subsequent substrates are stacked in identical fashion to create a "pack" or stack of substrates which are processed together as a unit. Each pack is placed on a shelf. A weight, such as a ceramic block or a lid, is placed on top to create a condition referred to as constrained sintering. Once a shelf is fully populated, subsequent ceramic block and shelves are placed vertically creating a second tier. Once the second tier is populated, subsequent tiers are built to the capacity of the furnace. The furnace firing program (i.e., temperature-time schedule) is then initiated which completes the anode firing process. Because a large stack of cells may be fired in this way, furnace throughput is kept high. The cell construction with anode and cathode electrodes formed with two different ink formulations and printing conditions allows stacking two-layer printed substrates face-to-face in pairs and prevents bonding during sintering.

Preferably, the anode and the cathode layer firing steps are separate firing steps. Thus, after the anode sublayers deposited, dried and then fired together, the electrolyte substrate is turned upside down and returned to the printing station. At the printing station, one or more cathode sublayers are deposited, dried and then fired together as will be described below.

For cathode electrode firing, the cells (e.g., electrolyte substrates, preferably with fired anodes printed on one side and unfired cathodes printed on the other side) are held in ceramic supports, frames or boats (referred to as "fixtures"). These ceramic fixtures hold each cell in place and spaced apart from adjacent cells. The fixtures prevent gross deformation of the cell during firing in order to avoid inducing camber into the part. The ceramic fixtures may be made from high purity alumina (e.g., 99.9% pure) or other suitable materials.

In another embodiment, the anode and the cathode layer firing is performed in the same step. In this case, the electrolyte substrate containing dried anode and cathode electrode layers is provided into a furnace and the anode and cathode are co-fired during the same step. The co-firing compensates for the camber of the cell which occurs when each side is sintered individually. The co-firing may be conducted with cells which are printed on both sides to be stacks in contact with each other (e.g., an anode of a first cell contacting anode of an adjacent second cell, and a cathode of the first cell contacting cathode of an adjacent third cell) without using ceramic fixtures for supporting each individual cell and separating adjacent cells from each other.

In another alternative embodiment, the cathode electrodes are not sintered at all prior to being placed into a fuel cell stack. In this embodiment, the anode layer or sublayers are printed on the electrolyte, dried and sintered. Then the cathode layer or sublayers are printed on the electrolyte and dried, but not sintered to complete one solid oxide fuel cell. The solid oxide fuel cell with the dried but unsintered cathode is then placed into a solid oxide fuel cell stack where adjacent fuel cells are separated by conductive (e.g., metal) interconnects/gas separator plates and sealed by glass or glass ceramic seals. The whole stack is then sintered to sinter the glass or glass ceramic seals. The sintering of the cathode electrodes in all cells of the stack occurs at the same time as when the seals in the stack are sintered. Thus, in this embodiment, both seals and the unfired and unsintered cathode electrodes in a solid oxide fuel cell stack (which contains SOFCs and interconnects) are sintered in the same step.

The furnace firing temperature setting may include a first time period or step during which the furnace is kept at steady temperature ramp rate, slowly increasing temperature or slowly decreasing temperature at the temperature were binders begin to burn-out from the printed and dried inks. The length of this first step is such that binders are completely burned out. The furnace temperature is then increased to a second, higher sintering temperature for a second time period or step where the electrode sintering occurs. The firing temperature profile may comprise heating the substrate at a first temperature for a sufficient time to burn out the electrode ink binders followed by heating the substrate at a second temperature higher than the first temperature for a sufficient time period to sinter the electrode. The firing may be conducted at a temperature greater than 1000 C, such as 1100 C to 1400 C. The anode and cathode electrode layers may be burned out at 1100 to 1200 C and sintered at temperatures below 1300 C, such as 1200 to 1300 C, thus reducing the cost of furnaces.

Preferably, convective furnace processing is utilized during anode and cathode firing in order to ensure complete binder burn-out. Convective furnace processing ensures there is sufficient air flow to oxidize and clear the binder off-gassed species. In an alternative embodiment, oxygen enriched air (i.e., oxygen added to air such that the ambient contains a higher concentration of oxygen than atmospheric air), pure oxygen or other active, oxidizing atmosphere may be utilized during the binder burn-out stage of anode and/or cathode firing in order to improve the process effectiveness and throughput. The sintering stage of the firing may be conducted in atmospheric air or an inert ambient (e.g., nitrogen ambient). Thus, in this embodiment, the first burn out firing step or stage is conducted in an ambient that contains a higher oxygen content than the second sintering firing step or stage.

The fabrication of the anode with a Ni—Co alloy can be achieved by first synthesizing a $Ni_{1-x}Co_xO$ powder with the desired stoichiometry and mixing it with a desired amount of SDC powder. For example, $0.05 \leqq x \leqq 0.3$. Any suitable ink processing (i.e., mixing the powders with the ink solvent), ink deposition, such as screen printing described above, and firing/sintering steps, such as the ones described above, can be used for anode fabrication. During anode reduction, the $Ni_{1-x}Co_xO$/SDC composite reduces to Ni—Co/SDC cermet and porosity. Alternatively, the Ni—Co alloy (i.e., a metal alloy rather than a metal oxide) can be produced in powder form, mixed with the SDC, deposited, and sintered in a reducing atmosphere to produce a similar anode compositionally with a different microstructure. Other alloying elements, such as Cu, may be used instead of or in addition to Co. Likewise, other ceramic materials, such as GDC, etc., may be used instead of or in addition to SDC.

Figure 5B:
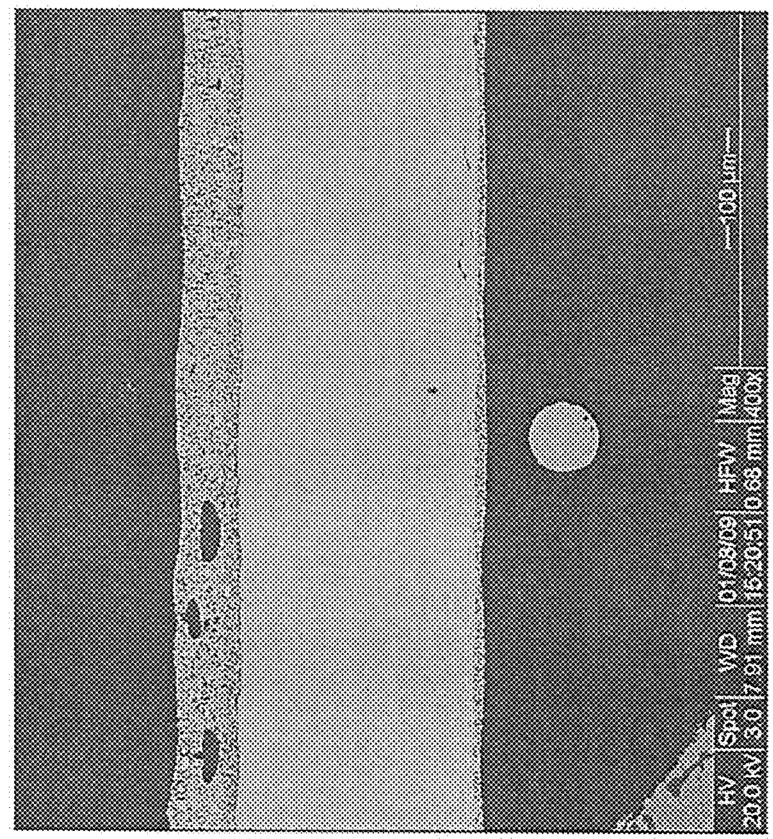
FIGS. 5A and 5B depict SEM images of anode electrode sub-layers in a solid oxide fuel.
Figure 5A:
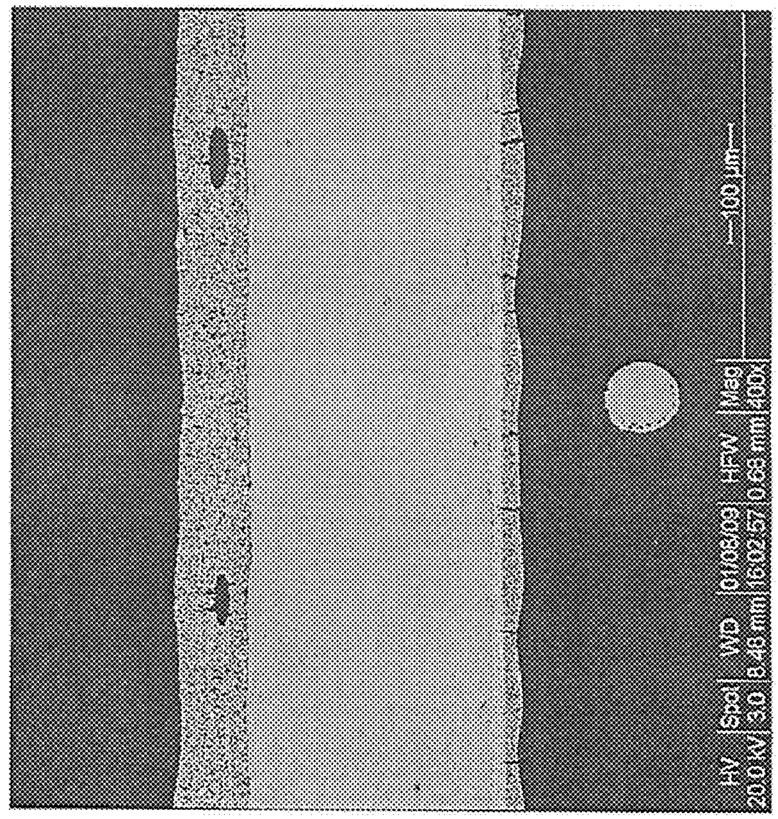

FIGS. 5A and 5B depict Scanning Electron Microscopy images of a SOFC oriented from cathode at the top of the image to anode at the bottom. The topmost layer in the image is the cathode electrode 7. The next layer is the electrolyte layer 5. The bottom layer is the anode 3. The anode is comprised of two sublayers 13 and 23. The SEM images show the condition of the anode sublayers after operation under conditions of fuel starvation using non-reformed hydrocarbon fuel.

FIG. 5A shows an image of a SOFC made according to a comparative example. The SOFC of the comparative example is described in U.S. application Ser. No. 11/907,204 filed on Oct. 10, 2007 and incorporated herein by reference in entirety. The SOFC of the comparative example lacks the Cu or Co in the upper sublayer 23. SOFC of the comparative example exhibits adequate performance. However, the image shows evidence of some of cracking.

FIG. 5B shows an image of a SOFC made according to an example of invention. The anode of the invention is thinner, e.g., about 9-16 microns, than the about 30 micron thick anode of the comparative example. The anode also contains cobalt substituting nickel in the upper sublayer. The anode of the example of the invention shows no evidence of structural or mechanical failure, such as cracking, delamination or dusting. Without wishing to be bound by a particular theory, the inventors attribute this change to the addition of Co to the nickel phase, forming a Ni—Co alloy. The decreased Ni concentration is believed to decrease the catalytic activity on the surface of the anode resulting in the spreading of the reformation reaction across the surface of the anode rather than having the reformation reaction be limited to the leading edge of the anode. Because the reaction is dispersed, the thermo-mechanical stresses are significantly decreased. Therefore, the anode of the example of the invention suffers less or no damage compared to the anode of the comparative example.

Figure 6:
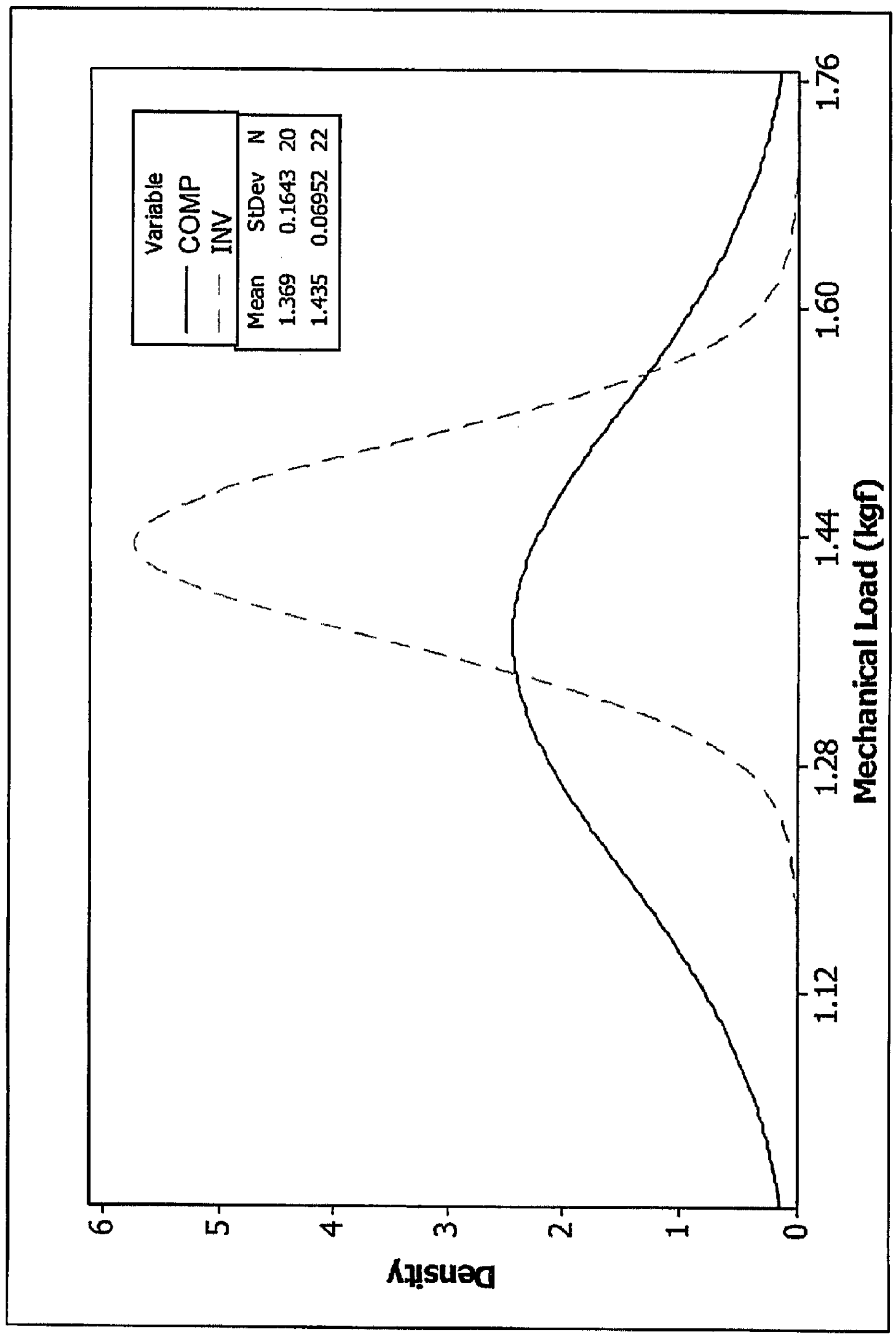
FIG. 6 is a plot of mechanical load testing data for cells according to a comparative example and an example of the invention.

FIG. 6 shows the results of mechanical load testing. The testing consisted of four point bend test of cells with the anode only. The graph plots the results for the comparative example (line "COMP") as well as the example of the invention (line "INV"). The plot of the results of the comparative example reveals a mean mechanical load of 1.369 kgf with a standard deviation of 0.16943. The plot of the data from the example of the invention shows a mean mechanical load of 1.435 kgf with a standard deviation is 0.06952. While both types of cells showed acceptable results, the cells of the example of the invention showed results which were consistent every time in their failure load, while the comparative example cells showed many outliers and generally inconsistent behavior. The cells of the example of the invention have a higher mean load to failure as well as the consistency, which is indicative that the interface between the electrolyte and electrode is better than in the comparative example cells. This may be attributed to less or no cracking of the anode of the example of the invention.

Figure 7:
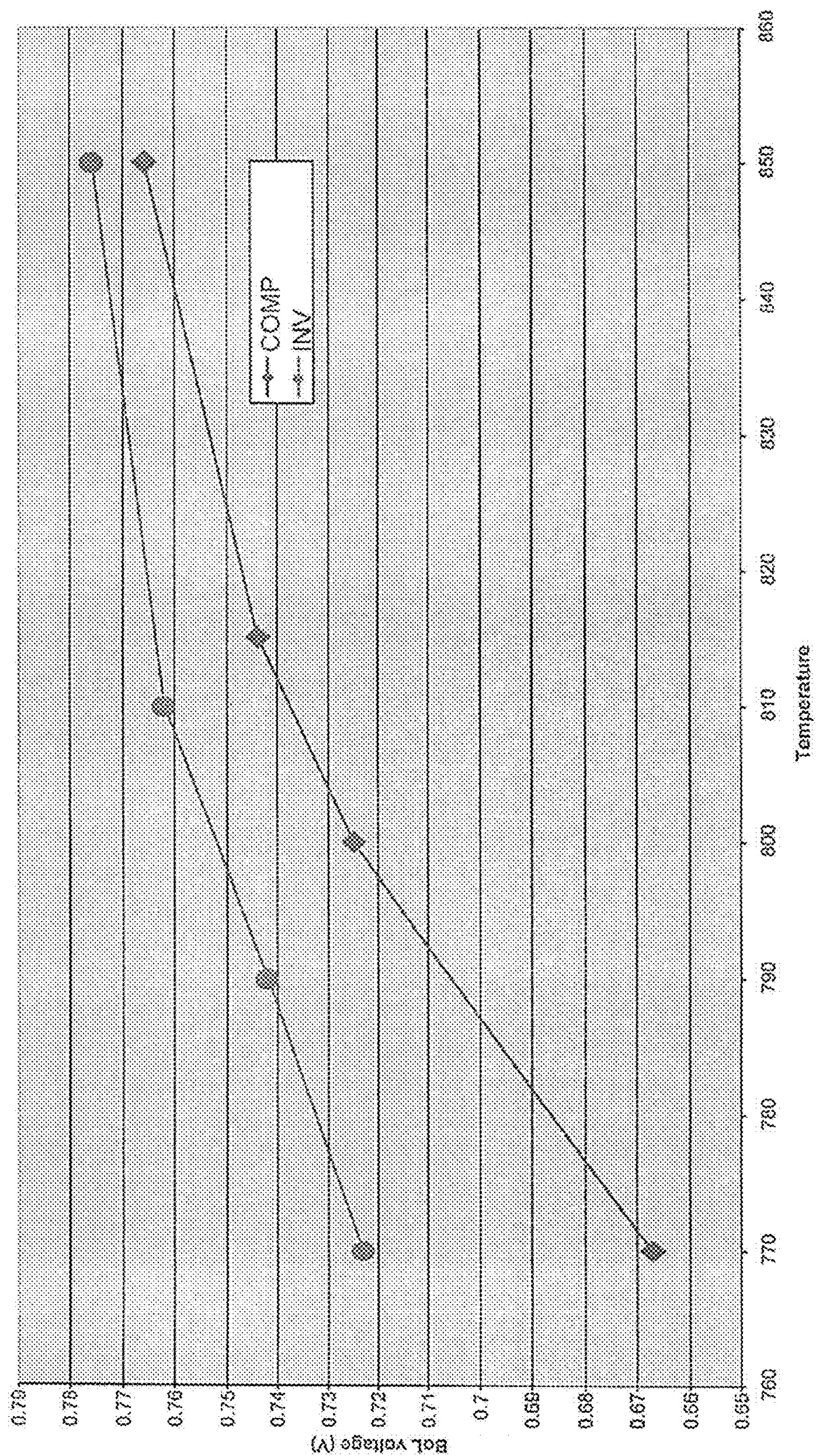
FIG. 7 is a plot of the beginning of life median output voltage for a compilation of several stacks while varying temperature for stacks according to a comparative example and example of the invention.

FIG. 7 depicts a plot of the median voltage compliance results at 30 amp operation for several fuel cell stacks according to the comparative example and the example of the invention. One stack tested contained some cell made according to the comparative example and other cells made according to the example of the invention. The data characterizes output voltage potential versus temperature for the stacks at beginning of life under operating conditions. Output potential was measured as temperature was varied from 770° C. to 850° C., with a steam to methane (e.g., carbon) ratio of 1.9, and fuel utilization of 90%. The results show higher output potential for the invention (such as an about 60 mV higher potential), thus providing an improved result in comparison to the sufficient results of the comparative example. The comparative example data at 770° C. indicates evidence of some coking, which is not observed for the example of the invention at the same temperature.

Figure 8:
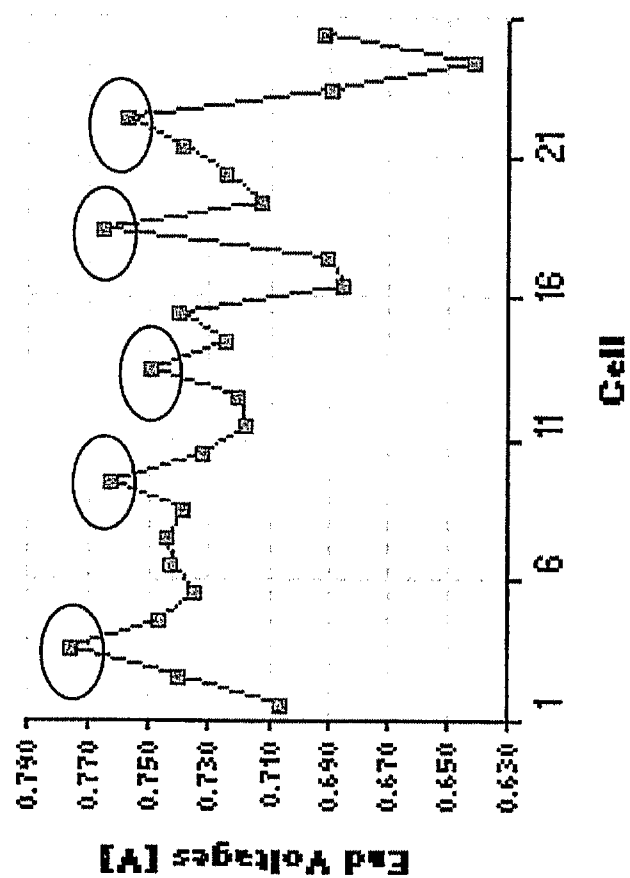
FIG. 8 is a plot of cell potential after 200 hours of operation for a 25 cell stack containing cells according, to as comparative example (un-circled) and an example of the invention (circled).

FIG. 8 is a graph of output voltage for a 25 cell stack containing cells according to both the comparative example and the example of the invention after 200 hours of operation at fuel utilization of 75% and operating at 850° C. The circled data points indicate the output voltage results for cells of the example of the invention after 200 hours of operation. The un-circled data points indicate the output voltage results for cells of the comparative example after 200 hours of operation. Of note is the cells of the invention all show a lower degree of degradation of output potential after operation than the stacks of a comparative example.

Figure 9:
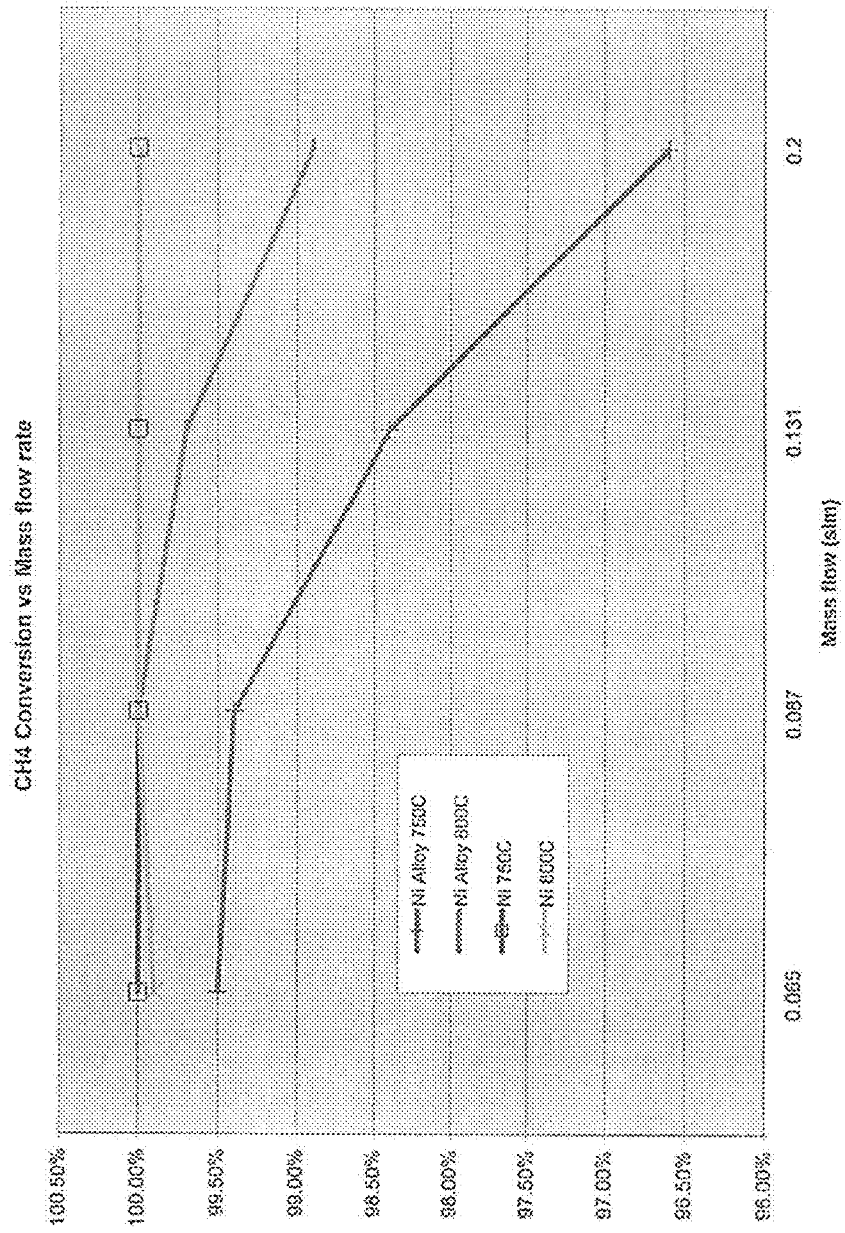
FIG. 9 is a graph of methane conversion versus mass flow for pure nickel of the comparative example and for a Ni—Co alloy of the example of the invention at 750 and 800° C.
Figure 10:
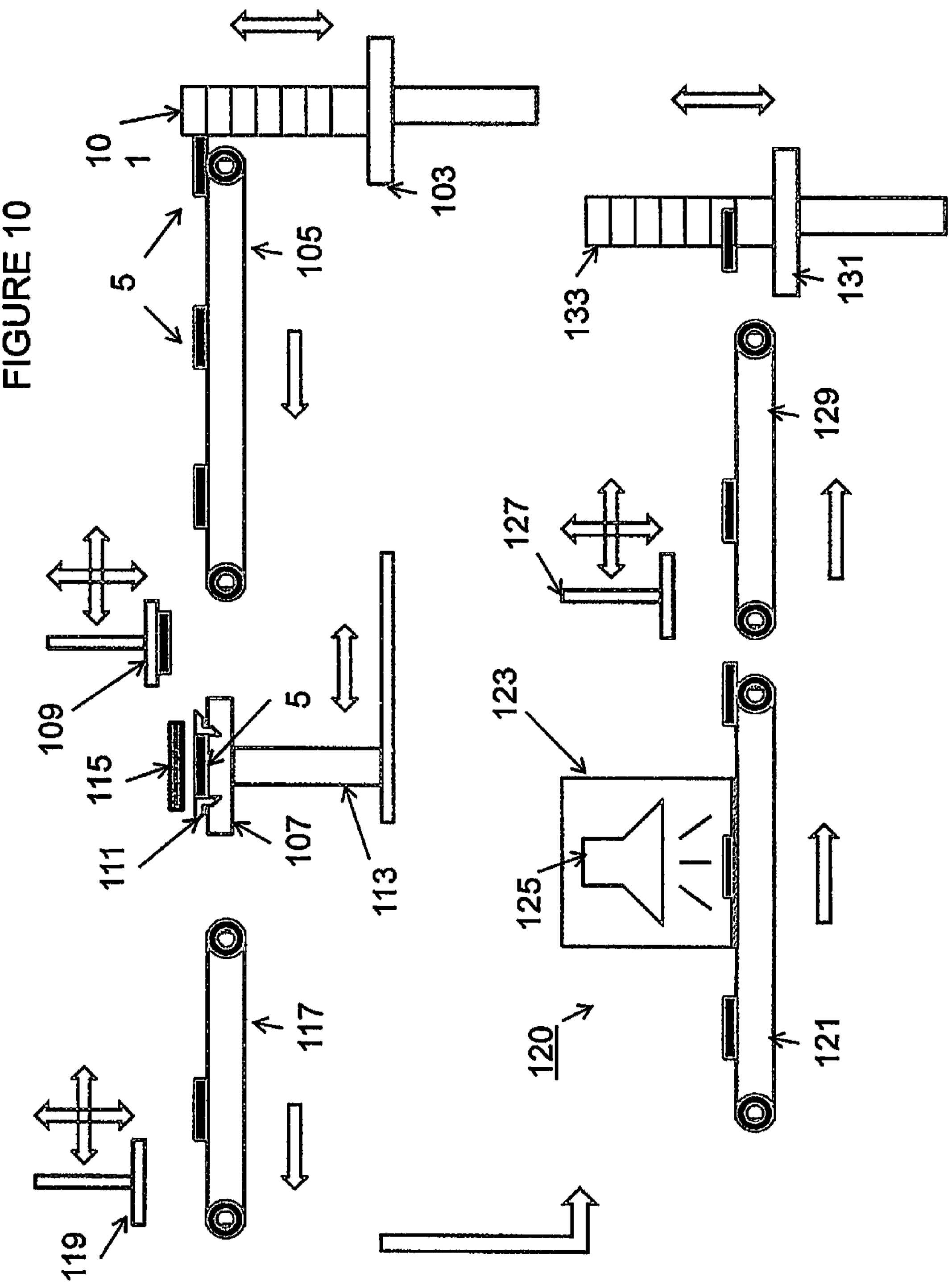
FIG. 10 is schematic representation of the apparatus and method steps used to fabricate a SOFC cell of one embodiment of the invention.

FIG. 9 is a graph of methane conversion versus mass flow rate of natural gas (in standard liters per minute) for pure nickel of the comparative example and for a Ni—Co alloy (10 atomic percent Co, 90 atomic percent Ni) of the example of the invention at 750 and 800° C. As can be seen from the figure, the electrocatalytic reformation conversion of pure Ni is higher compared to a Ni—Co alloy where the volume fraction of metal and ceramic are identical for the two second layers 23. The higher the mass flow, the more efficient the catalyst has to be to reform all the methane. The Ni—Co catalyst provides a slower catalytic reaction because methane is detected at a lower mass flow rate.

The anode electrode contains a doped ceria phase rich interface at a three phase boundary with the electrolyte and a rich nickel phase region adjacent to the "free" surface of the anode electrode which is distal from the electrolyte (i.e., the surface of the anode 3 which faces the interconnect 9). Without wishing to be bound by a particular theory, the present inventors believe that the greater stability of the anode electrodes of the embodiments of the present invention under conditions of very high fuel utilization can be primarily attributed to the presence of the ceria rich interface at the three phase boundary. The mixed ionic and electronic conducting nature of the doped ceria acts as a buffer to the oxygen ion flux through the electrolyte, thus mitigating the rapid conversion of nickel to nickel oxide. Mechanical damage of the electrode/electrolyte is avoided and upon the establishment of normal operating conditions, minimal polarization change in the anode is observed. Because the ceria-based ceramic has a lower electronic conductivity than nickel, the presence of a small amount of nickel improves the conductivity of the first sublayer(s) without causing any deleterious effect to the mechanical stability under fuel starvation conditions.

The anode electrode further contains a metal rich region of a nickel alloy distal from the electrolyte. The inventors believe that decreasing the nickel concentration will disperse the steam reforming active region of the anode away from the leading edge. Because nickel is such a strong electrocatalyst, it is believed the high Ni concentration results in a majority of the reforming occurring within a few centimeters of the anode's length (i.e., at the leading edge where the hydrocarbon fuel enters the anode space between the anode and the interconnect). The elevated concentration of highly endothermic steam reforming results in thermo-mechanical stress and anode delamination. Partially deactivating the Ni catalyst by replacing it with a less catalytic or non-catalytic metal, such as Cu and/or Co in the entire upper anode sublayer, allows the reforming reaction to be spread over the entire length (i.e., area) of the anode surface from fuel inlet to outlet, and decreases the high temperature gradient. The decreased temperature gradient results in lower thermo-mechanical stress at the leading edge of the cell thereby minimizing the cause of the anode delamination and failure mechanism. This also lowers the dusting and Ni carbide formation. Furthermore, since the doped ceria ceramic phase of the anode, such as SDC, is electrocatalytically active, the total catalytic activity of the anode is not significantly reduced.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A method of making a solid oxide fuel cell (SOFC), comprising:

forming a first sublayer of a first electrode on a first side of a planar solid oxide electrolyte;

drying the first sublayer of the first electrode;

forming a second sublayer of the first electrode on the dried first sublayer of the first electrode prior to firing the first sublayer of the first electrode;

firing the first and second sublayers of the first electrode during a same first firing step; and forming a second electrode on a second side of the solid oxide electrolyte, wherein the same first firing step comprises placing a stack of solid oxide electrolytes into a furnace such that surfaces of the electrolytes printed with the first electrode face and contact each other and convectively firing the first electrode.

2. The method of claim 1, wherein the step drying is conducted at a first temperature, the step of firing is conducted at a second temperature, and the first temperature is at least three times less than the second temperature.

3. The method of claim 2, wherein the first temperature is less than 150 C and the second temperature is greater than 1000 C.

4. The method of claim 1, wherein the first electrode comprises an anode electrode.

5. The method of claim 4, wherein:

the first sublayer of the anode electrode comprises a cermet comprising a nickel containing phase and a doped ceria containing phase;

the second sublayer of the anode electrode comprises a cermet comprising a nickel containing phase and a doped ceria containing phase; and the first sublayer of the anode electrode contains a lower ratio of the nickel containing phase to the ceramic phase than the second sublayer of the anode electrode.

6. The method of claim 5, wherein the doped ceria phase comprises a Sm doped ceria phase and the nickel containing phase comprises nickel or 1 to 50 atomic percent of at least one of Co or Cu and balance nickel.

7. The method of claim 1, wherein the first electrode comprises a cathode electrode.

8. The method of claim 1, wherein the step of forming the second electrode comprises:

forming a first sublayer of a second electrode on the second side of the planar solid oxide electrolyte;

drying the first sublayer of the second electrode;

forming a second sublayer of the second electrode on the dried first sublayer of the second electrode prior to firing the first sublayer of the second electrode; and firing the first and second sublayers of the second electrode.

9. The method of claim 8, wherein the step of firing the first and second sublayers of the second electrode comprises a second firing step which occurs after the same first firing step.

10. The method of claim 8, wherein the step of firing the first and second sublayers of the second electrode comprises the same first firing step such that the first and the second electrodes are fired during the same first firing step.

11. The method of claim 1, further comprising drying the second sublayer of the first electrode prior to the same first firing step.

12. The method of claim 1, wherein:

the step of forming the first sublayer of the first electrode comprises screen printing the first sublayer; and the step of forming the second sublayer of the first electrode comprises screen printing the second sublayer.

13. The method of claim 12, wherein the step of forming the first sublayer of the first electrode comprises:

placing the electrolyte into a slotted cassette;

installing the cassette into an elevator which positions the electrolyte onto conveyor;

transporting the electrolyte to a screen printing tool plate;

aligning the electrolyte into position on the screen printing tool plate;

applying a hold down vacuum to hold the electrolyte on the screen printing tool plate; and screen printing the first sublayer of the first electrode using an ink comprising 80 to 93% by weight solids.

14. The method of claim 13, wherein the step of drying the first sublayer of the first electrode comprises placing the electrolyte on a belt, transporting the electrolyte to a heating zone, and drying the first sublayer of the first electrode using a infrared heating lamp.

15. The method of claim 1, wherein:

the same first firing step comprises a burnout stage conducted in a first ambient at a first temperature and a sintering stage conducted in a second ambient at a second temperature;

the second temperature is higher than the first temperature; and the first ambient contains a higher oxygen content than the second ambient.

16. The method of claim 1, wherein the step of forming the second electrode comprises screen printing the second electrode on the second side of the planar solid oxide electrolyte, drying the second electrode, and firing the second electrode in a second firing step.

17. The method of claim 16, wherein the second firing step comprises inserting the electrolyte containing the dried second electrode into a ceramic fixture, placing the fixture into the furnace such that the electrolyte does not contact adjacent electrolytes, and firing the second electrode.

18. The method of claim 1, wherein:

the first electrode comprises an anode electrode; and the second electrode comprises a cathode electrode.

19. The method of claim 18, wherein the step of forming the second electrode comprises:

printing the cathode electrode on the second side of the solid oxide electrolyte after firing the first and second sublayers of the anode electrode during the same first firing step;

drying the cathode electrode;

placing the electrolyte comprising the fired anode electrode and the dried, unfired cathode electrode into a solid oxide fuel cell stack;

forming glass or glass ceramic seals in the solid oxide fuel cell stack; and sintering the solid oxide fuel cell stack to sinter the glass or glass ceramic seals and to sinter the cathode electrode in the same step.

20. A method of making solid oxide fuel cells (SOFCs), comprising:

providing a plurality of planar solid oxide electrolytes, each electrolyte having a first major side and a second major side;

forming a first electrode on the first major side of each of the plurality of planar solid oxide electrolytes;

stacking the plurality of solid oxide electrolytes into a stack such that the first major sides containing the first electrode of each pair of adjacent electrolytes in the stack face each other; and firing the stack, wherein:

the first major sides containing the first electrode of each pair of adjacent electrolytes in the stack contact each other during the step of firing.

21. The method of claim 20, wherein:

the second major sides of each electrolyte in the stack lack an electrode during the step of firing.

22. The method of claim 21, wherein except for a top and bottom electrolyte in the stack, the second major sides of each pair of adjacent electrolytes in the stack face the second major side of an adjacent electrolyte in the stack.

23. The method of claim 21, further comprising:

drying the first electrode after the step of forming and before the step of firing; and forming a second electrode on the second major side of each of the plurality of planar solid oxide electrolytes after the step of firing.

24. The method of claim 20, wherein:

the first electrode comprises an anode electrode;

the step of forming the first electrode comprises screen printing a first sublayer of the first electrode, drying the first sublayer, and screen printing a second sublayer of the first electrode on the first sublayer; and the step of firing comprises placing the stack into a furnace, placing a weight on the stack and convectively firing the first electrode.

25. A method of making a solid oxide fuel cell (SOFC), comprising:

forming a first sublayer of a first electrode on a first side of a planar solid oxide electrolyte;

drying the first sublayer of the first electrode;

forming a second sublayer of the first electrode on the dried first sublayer of the first electrode prior to firing the first sublayer of the first electrode;

firing the first and second sublayers of the first electrode during a same first firing step; and forming a second electrode on a second side of the solid oxide electrolyte;

wherein:

the first electrode comprises an anode electrode; and the second electrode comprises a cathode electrode;

wherein the step of forming the second electrode comprises:

printing the cathode electrode on the second side of the solid oxide electrolyte after firing the first and second sublayers of the anode electrode during the same first firing step;

drying the cathode electrode;

placing the electrolyte comprising the fired anode electrode and the dried, unfired cathode electrode into a solid oxide fuel cell stack;

forming glass or glass ceramic seals in the solid oxide fuel cell stack; and sintering the solid oxide fuel cell stack to sinter the glass or glass ceramic seals and to sinter the cathode electrode in the same step.

* * * * *